Dec. 8, 1964 TAKASHI KUMAGAI 3,160,466

RECORD-RETAINING MATERIAL OF HELICAL CONFIGURATION

Filed Sept. 11, 1961

2 Sheets-Sheet 1

Dec. 8, 1964 TAKASHI KUMAGAI 3,160,466

RECORD-RETAINING MATERIAL OF HELICAL CONFIGURATION

Filed Sept. 11, 1961 2 Sheets-Sheet 2

United States Patent Office 3,160,466

Patented Dec. 8, 1964

3,160,466
RECORD-RETAINING MATERIAL OF HELICAL CONFIGURATION

Takashi Kumagai, 231 Kinuta-cho, Setagaya-ku, Tokyo-to, Japan

Filed Sept. 11, 1961, Ser. No. 137,351
Claims priority, application Japan, Nov. 2, 1960, 35/43,674
3 Claims. (Cl. 346—137)

This invention relates to record-retaining materials for recording and reproducing developed images of various kinds such as those retained on, for example, cinematographic film, sound-recording tape, and self-recorder chart paper. More particularly, this invention relates to a new record-retaining material of helical or screw-shaped, three-dimensional configuration.

Conventional materials for such recording and reproducing, of plane surface configuration, have included sound-recording tape of ribbon form, photographic film, and sound-recording and picture-recording materials of disk form or rectangular plate form. As such material of three-dimensional form, such materials as those of cylindrical surface or semi-cylindrical surface form are known. Furthermore, such material of wire form are also known.

In the case of record-retaining materials of ribbon or wire form, since they do not possess three-dimensional forms inherently in themselves, they must, in general, be held by being wound on winding reels and used as they are being rewound onto separate take-up reels. Moreover, when it is desired to use one of such reels from an intermediate point thereof, it is necessary to unwind the material to the said intermediate point.

In the case of such record-retaining materials of flat form such as disks and rectangular plates and cylindrical form, the compilation and editing of their contents is extremely difficult. Furthermore, they have the inconvenience in that their surface becomes excessively large when large qauntities of information are to be recorded continuously.

It is an object of the present invention to provide a new record-retaining material of unique, helical or screw configuration which does not have any of the above-mentioned disadvantages.

It is another object of the invention to provide a record-retaining material as stated above which can be produced and used in a relatively simple and economical manner.

Said object and other objects of this invention have been attained by a recording-retaining material consisting of a strip material having a screw-shaped configuration and having such flexibility or elasticity as that its screw helix angle may be made variable.

The manner in which the foregoing as well as other objects and advantages of the present invention may best be achieved will be understood more fully from a consideration of the following description, taken in conjunction with the accompanying drawings in which the same and equivalent parts are designated by the same reference numerals, and in which.

Figure 1:
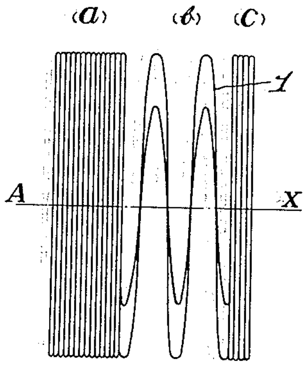
FIG. 1 is a side elevational view showing the fundamental configuration and nature of the screw-shaped, record-retaining material according to the present invention.

The record-retaining material 1 of fundamental configuration as illustrated in FIG. 1 has a unique, helical or screw form in three dimensions and is made of a flexible or elastic substance. It is stored in a densely laminar state as shown at part *a*, which is its normal state. When this material is to be used, it may be easily stretched axially to lengthen its helical pitch as shown at part *b* because of its flexibility or elasticity. Then, after use, the material may be stored again in a closely laminar state as indicated at part *c*. During such a stretching and contracting procedure, the record-retaining material is shifted along the axis A–X from part *a* to part *c*.

The axis A–X in this case, of course, need not always be a straight line; it may be curved or form a loop A–X–A.

The basic form of the record-retaining material of the present invention as described above may be applied in the form of the following modified embodiments.

Figure 2:
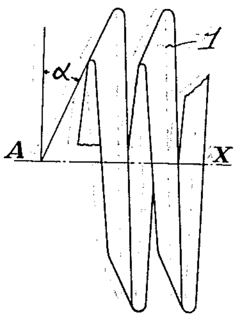
FIG. 2 is a side elevation view showing a portion of one modified form of the record-retaining material according to this invention.

FIG. 2 illustrates an embodiment wherein the surface or record medium has a record-retaining material of screw form and the convolutions are conical being inclined at an angle $\alpha$ relative to a plane perpendicular to the screw axis and shows a portion of the said material corresponding to part *b* of FIG. 1. This form of the record medium affords a larger strip width for the same helical diameter than in the case of FIG. 1 and affords great convenience in optical recording, provided the angle $\alpha$ is suitably selected. The convolutions can be spaced axially along their axis with a varying helix angle. Moreover, the material is capable of self-restoration so the convolutions can assume a nested condition when not spaced apart.

Figure 3:
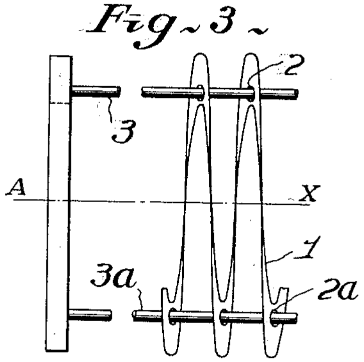
FIG. 3 is a side elevational view, with parts cut away, showing one manner in which material of FIG. 1 may be held on the holding means.

In order to facilitate the maintenance of the three-dimensional form of the record-retaining material of FIG. 1, the said material may be provided with holding holes 2 and 2*a*, and holding bars 3 and 3*a* passed therethrough as indicated in FIG. 3. When this holding method is used, the holding of the screw configuration of the said material is relatively easy even when the assembly is to be rotated about the axis A–X.

Figure 4:
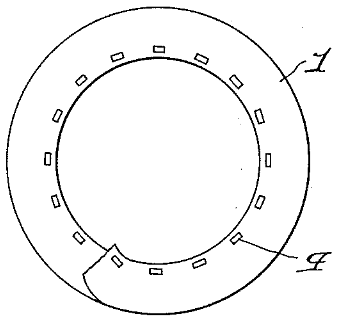
FIGS. 4 and 5 are axial views showing modifications of the manner of holding the material of FIG. 1.
Figure 5:
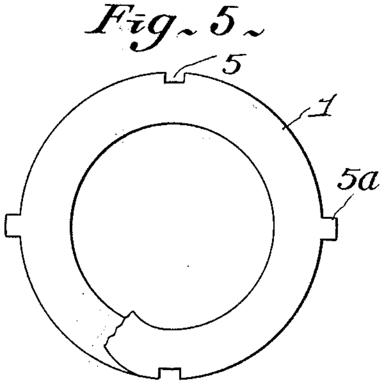

FIGS. 4 and 5 show examples of the material of FIG. 1 provided with perforations 4 for feeding thereof, holding notches 5, and holding projections 5*a*. Of course, these notches and projections may be provided on the inner edge of the material with equal effectiveness.

Figures 6, 7, 8:
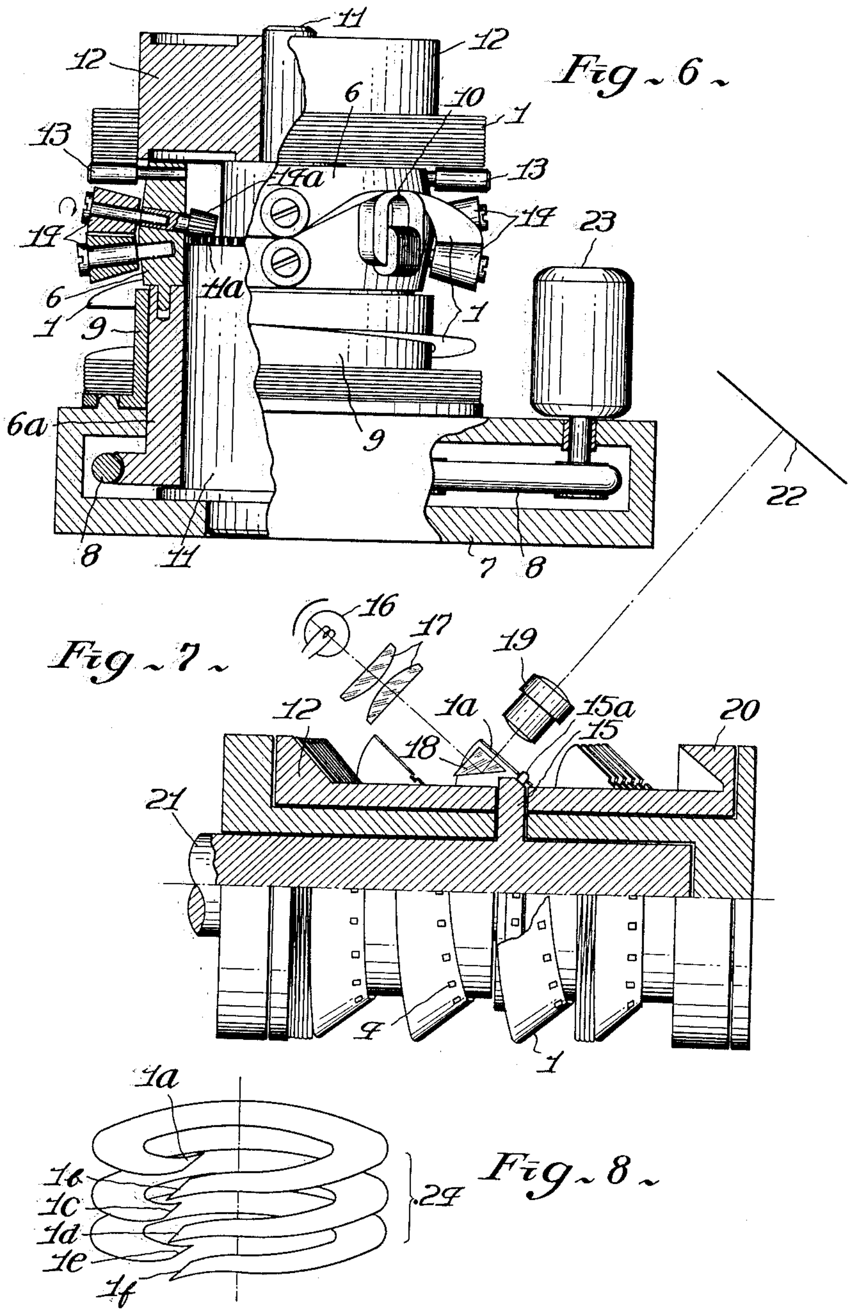
FIG. 6 is an elevation view, one half in section, showing one example of application of the material of FIG. 1 for electromagnetic recording.
FIG. 7 is an elevational view, one half in section, showing one example of application for optical recording, in which an arrangement wherein the record is projected on a screen is illustrated schematically.
FIG. 8 is a perspective view showing a method of constructing a record-retaining material according to this invention.

One example of use of the record-retaining material of FIG. 1 as a magnetic record-retaining material as well as suitable apparatus therefor are illustrated in FIG. 6. The said material is supported about the peripheral surface of a supporting cylinder 12 mounted on the upper part of a stationary shaft or arbor 11. A hollow pulley 6*a* is rotatably mounted on the shaft 11 and driven by an electric motor 23 through a driving belt 8 acting on said pulley, said motor being mounted on a base body 7. A rotating, driving ring 6 is detachably fitted onto the body of said pulley 6*a* at their projection and recess so as to be rotated together with said pulley and, in turn, supports rotatively auxiliary rollers 13 and driving rollers 14, and supports integrally a magnetic head 10. Each of said driving rollers 14 is provided with a taper pinion **14*a* which is engaged with a fixed crown gear 11*a* provided on stepped or shoulder surface of the stationary shaft 11. A reel cylinder 9 is mounted on the base body 7** so as to be axially detached together with the record-retaining material accumulated thereon.

When the electric motor 23 is driven, the driving ring 6 is rotated, whereby the record-retaining material 1 is fed to the magnetic head 10 by the driving rollers 14 and is magnetized, then is fed gradually downward to be supported by the reel cylinder 9.

According to this method, the record-retaining material does not rotate. Therefore, it is possible to supplement the said material during operation in an easy manner.

One example of the application of the record-retaining material of the invention to optical recording and apparatus suitable therefor are indicated in FIG. 7. The record-retaining material 1 is provided with perforations 4 for feeding thereof and is fed by the sprocket teeth 15*a* of a feeding sprocket wheel 15 from a freely-rotating support cylinder 12 to another support cylinder 20, said sprocket wheel 15 being driven by a driving shaft 21 which is driven by a motor, for example by an electric motor not shown. During this feeding operation, light from a light source 16 is passed through condenser lenses 17 and a prism 18, then through the record-retaining material 1, whereby the optical picture 1*a* on the said material 1 is projected by a projection lens group 19 onto a screen 22.

According to this method, there is no necessity of rewinding the record-retaining material. Moreover, by an extremely simple operation it is possible to project picture records from any desired intermediate point of the said material.

The screw-shaped, record-retaining material according to the present invention has numerous advantages, the principal of which are set forth below.

(1) Compilation and editing of records are possible, and a large quantity of recorded information does not entail a large physical volume.

(2) Selection of any particular portion even within one winding can be made freely and rapidly.

(3) It is possible to use the record-retaining material without rotating the said material itself, and the said material can be supplemented during operation.

(4) In the case of visible records, it is possible to open the winding to any desired point and to examine it in a rapid and easy manner.

The record-retaining material of screw-shaped configuration according to the present invention may, of course, be made by any method such as that of rolling one side of an ordinary tape of suitable properties under greater force than that on the other side or that of splitting radially a plurality of annular disk pieces 24 at their portions as illustrated in FIG. 8 and joining, respectively, the cut end 1*b* with 1*c* and the cut end 1*d* with 1*c*.

Since it is obvious that many changes and modifications can be made in the above-described details without departing from the nature and spirit of the invention, it is to be understood that the invention is not to be limited to the details described herein except as set forth in the appended claims.

What is claimed is:

1. A record-retaining medium comprising a strip of material having substantially coaxial helical convolutions extendable longitudinally along the axis of the convolutions, and each of said convolutions of said strip material having a substantially frusto conical configuration, the recording surface thereof making an angle other than ninety degrees with said axis relative to which said convolutions are coaxially disposed.

2. A record-retaining medium comprising a strip of material having substantially coaxial helical convolutions extendable longitudinally along the axis of the convolutions, each of said convolutions of said strip material having a substantially frusto conical configuration, the recording surface thereof making an angle other than ninety degrees with said axis relative to which said convolutions are coaxially disposed, and said material having the characteristic of being flexible for disposing the convolutions axially relative to said axis with a varying helix angle and having the capability of self-restoration in which said conical convolutions assume a substantially nested position in the absence of application of forces displacing said convolutions along said axis axially displaced relative to each other.

3. A record-retaining medium comprising a strip of material having substantially coaxial helical convolutions extendable longitudinally along the axis of the convolutions, each of said convolutions of said strip material having a substantially frusto conical configuration, the recording surface thereof making an angle other than ninety degrees with said axis relative to which said convolutions are coaxially disposed, said material having the characteristic of being flexible for disposing the convolutions axially relative to said axis with a varying helix angle and having the capability of self-restoration in which said conical convolutions assume a substantially nested position in the absence of application of forces displacing said convolutions along said axis axially displaced relative to each other, and said record-medium comprising apertures for driving said record-medium helically.

References Cited in the file of this patent

UNITED STATES PATENTS

| | | |
|---|---|---|
| 730,964 | Prestwich | June 16, 1903 |
| 766,666 | Casterline | Aug. 2, 1904 |
| 2,990,182 | Cailliot | June 27, 1961 |